Sept. 12, 1967   L. E. FOURNIER   3,341,752

SPRING CLAMP CONNECTOR MOUNTED CAPACITOR

Filed Feb. 24, 1965

INVENTOR
Lawrence E. Fournier
BY Connolly and Hutz
ATTORNEYS

United States Patent Office 3,341,752
Patented Sept. 12, 1967

3,341,752
SPRING CLAMP CONNECTOR MOUNTED
CAPACITOR
Lawrence E. Fournier, Penacook, N.H., assignor to
Sprague Electric Company, North Adams, Mass.,
a corporation of Massachusetts
Filed Feb. 24, 1965, Ser. No. 434,947
4 Claims. (Cl. 317—230)

ABSTRACT OF THE DISCLOSURE

A solid electrolyte capacitor section sealed within an insulating sleeve by resin plugs has an anode lead and a cathode lead extending from opposite ends of the capacitor section through the respective resin plug to join large cup-shaped metallic terminals secured over the ends of the sleeve.

---

This invention relates to a solid electrolyte capacitor, and particularly to a solid electrolyte capacitor designed for spring clamp installation in an electrical circuit.

Dry or solid electrolyte capacitors, such as tantalum solid electrolyte capacitors, have found popular use in circuit designs where space, weight, and reliability are critical. This invention relates to a capacitor design which permits compact, snap-in installation of the device in an electrical circuit.

As a general rule, these capacitors are constructed by pressing and sintering a valve-metal pellet with integrally connected anode lead. Then the pellet is coated with a dielectric oxide followed by a dry electrolyte layer, deposited in and around the pores of the pellet. The element is then coated with a conductive coating to provide a contact electrode. A cathode lead-wire is the connected to the conductive coating as by soldering to complete the capacitor subassembly.

The above subassembly is then, usually, disposed within a protective casing with leads extended for connection to the desired circuit. Such connection being made by soldering or welding of the capacitor leads to members provided on the circuit board. This method of installation places a restriction on the circuit design, in that provision must be made for such soldering or welding. Such restriction often causes difficulty with miniaturized circuits, where the basic network is mass produced in as compact a form as possible and separate components are connected at a later stage.

In such a circuit design, it is often desirable to avoid soldering or welding of the capacitor where the required heating may damage the circuit or where it is not economical to provide access to the circuit for such connection.

Furthermore, such soldering or welding is in many instances relatively expensive since this operation, often, does not lend itself to mass production techniques. Such installation also makes future replacement of the capacitor somewhat cumbersome and expensive.

It is an object of this invention to produce a capacitor which overcomes the foregoing disadvantages.

It is a further object of this invention to produce a capacitor capable of being mechanically and electrically connected, in an inexpensive and compact manner, to an electrical network.

It is a still further object of this invention to produce a capacitor having large terminals designed for spring clamp installation in an electrical network.

It is a still further object of this invention to produce a capacitor designed for simple and inexpensive replacement in an electrical network.

Figure 1:
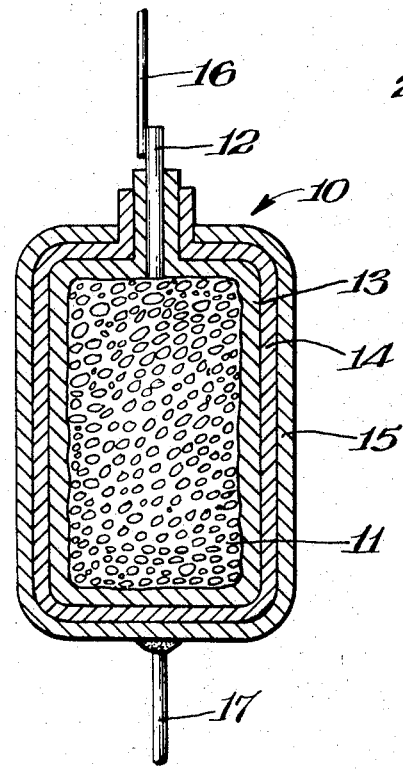
Figure 2:
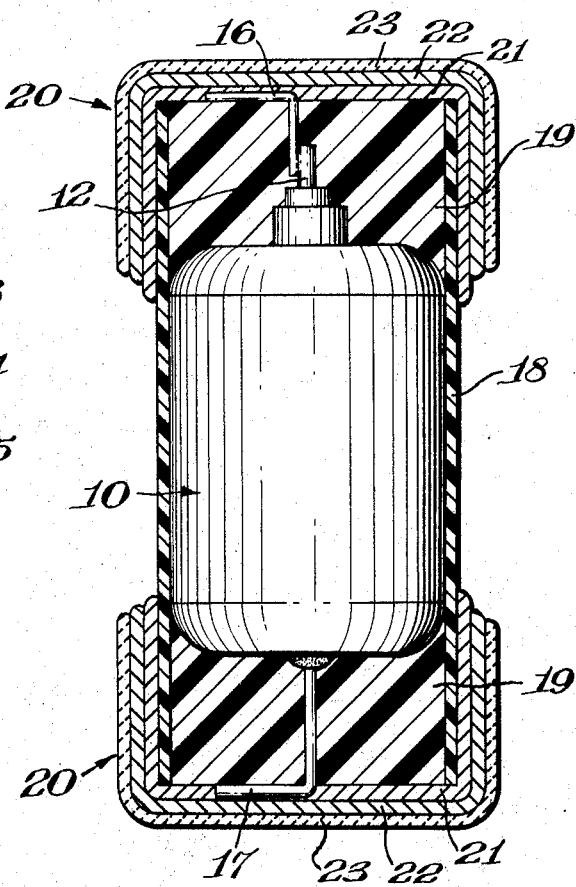

These and other objects of this invention will become apparent from the following specification and the accompanying drawing, in which:

FIGURE 1 is a side view partly in section and partly in elevation of a solid electrolyte capacitor subassembly; and FIGURE 2 is a side view partly in section and partly in elevation of a solid electrolyte capacitor embodying this invention.

In its broadest scope, the objects set forth are achieved in accordance with this invention by a capacitor having large terminals secured to each end of the capacitor. In a specific embodiment, the objects are achieved by sealing a solid electrolyte capacitor section within a tubular insulator casing, said section having a lead extending axially from each end through resin plugs sealing said casing, said leads connected to large cup-shaped metallic terminals secured to each end of said casing.

In FIGURE 1, a solid electrolyte capacitor subassembly is shown. The capacitor section 10 is of the type described in the foregoing wherein a sintered pellet 11 is made up from tantalum particles pressed into a coherent pellet to about one-half the density of solid tantalum and vacuum sintered to yield a porous body. An anode lead 12 is welded to the pellet 11 and the pellet 11 is anodized to form a dielectric oxide 13 on the surfaces of the sintered particles and the lead 12.

A suitable solid electrolyte coating 14 such as manganese dioxide overlies the oxide layer 13, is closely adherent to it and substantially fills the pores of the pellet 11. This electrolyte layer 14 must not contact the bare metal lead 12. Thus the anode lead 12 must be coated with oxide 13 as shown to avoid such contact where the solid electrolyte 14 envelops the entire pellet 11.

A conductive coating 15 is then deposited over the electrolyte layer 14 to provide the contact electrode. This coating 15 covers a substantial part of the total area of the pellet 11 from the end opposite the lead 12 to a zone adjacent to but not in contact with the lead 12. Thereby leaving a portion of the electrolyte 14 uncoated by the cathode coat 15 in the area surrounding the anode lead 12.

The above named coatings are shown as layers in the illustration, for reasons of clarity, but it should be understood that each coating penetrates the porous surface of the pellet thereby coating the particles of the pellet, not merely the outer extremity as shown.

To complete the subassembly 10, an anode lead extension 16 and a cathode lead 17 are connected to appropriate elements. The lead extension 16 is welded to the lead 12, whereas the cathode lead 17 is soldered to the conductive coating. These leads may be of any desired material such as for example nickel.

Referring to FIGURE 2 wherein is shown the capacitor section 10, as described above, disposed coaxially within a tubular insulator casing.

The insulator sleeve 18 in this embodiment is a hollow cylinder of Mylar (polyethylene terephthalate) or the like. However, neither the cylindrical form nor the material described are necessary to the invention. For example, a rectangular sleeve of suitable insulating properties would also be satisfactory.

As shown, the leads 16 and 17 extend coaxially from the capacitor section 10 through resin plugs 19 and are then bent at substantially 90° to the longitudinal axis of the sleeve 18. The leads are cut short so as not to extend beyond the inner periphery of the sleeve 18. The plugs 19 are formed from an insulating material such as epoxy, however other suitable resins could also be used.

The plugs 19 not only seal each end of the sleeve 18 but also provide support for the leads 16 and 17 so that their point of flexure occurs at some distance from their internal connection. Thus, the weld of lead 16 to lead 12 is made to occur adjacent the internal side of plug 19 with sufficient thickness of resin external to the weld to protect the connection from stress when the bend of lead 16 is made. In a similar manner, the solder connection of lead 17 to the cathode coat is protected by the plug 19, which surrounds lead 17.

Cup-shaped terminals 20 are provided on each end of the sleeve 18. These terminals 20 encompass the ends and a portion of the outer circumference of the sleeve 18 to provide a large contact area of cup-like shape. Each terminal 20 is connected in ohmic contact with the lead adjacent to it. The terminals 20 extend along the body of the sleeve 18 for a short distance toward each other but remain insulated from each other by the body of the sleeve 18 which separates each terminal 20.

In this embodiment, the terminals 20 are formed on each end of the sleeve 18 by depositing three successive layers of conductive coatings. Thus a first coat 21, of silver, such as Du Pont Silver #5605A is deposited on the ends of the sleeve 18 by dipping and then curing at 180° C. The deposit of the coating 21 on each end of the sleeve 18 is such as to provide adherence to the sleeve 18 as well as ohmic connection to the adjacent lead 16 or 17.

A second coat 22 of less silver content than the first coat 21 is then applied to overlie the first coat 21 and adhere to it. The second coat 22 may be Du Pont Silver #4817 which is applied by dipping and then curing at 100° C. Then to complete the terminal 20, a hard coat 23 of tin-lead solder is applied, to overlie the second coat 22. This final coat 23 is applied by dipping the coated ends of the sleeve 18 in molten solder, having first cleaned the ends by an appropriate flux.

In the described embodiment of this invention, the terminals are formed from silver and solder coatings. However, other conductive coatings could be employed. The terminals could also be fabricated by other means, such as machining, stamping or the like. And then secured to the sleeve 18 with connection to the appropriate lead 16 or 17.

The terminals could also be made in a variety of shapes to utilize particular spring clamps. Thus the terminals could, for example, be rectangular or cylindrical sleeves.

Furthermore, although the invention has been described in terms of a specific embodiment of a capacitor, it should be understood that many different embodiments of this invention may be made without departing from the spirit and scope thereof and that the invention is not limited except as defined in the appended claims.

What is claimed is:

1. A solid electrolyte capacitor comprising a capacitor section having a cathode and an anode of film-forming metal, a dielectric oxide film on the surface of said anode and a solid electrolyte disposed between and in contact with said film and said cathode, an insulating sleeve having said section disposed therein and insulating means sealing each end thereof, said anode and cathode having a terminal lead extending respective from opposite ends of said section through said insulating means, and a metallic terminal disposed about each end of said sleeve and on the surface of each insulating means, and each of said terminal leads electrically connected to a respective said metallic terminal.

2. The capacitor of claim 1 wherein said sleeve is polyethylene terephthalate, and said insulating means is an epoxy resin plug.

3. The capacitor of claim 1 wherein said terminals consist of a plurality of conductive coatings.

4. The capacitor of claim 3 wherein said terminals consist of a first undercoat of silver, a second coat of silver overlaying said first coat, an external coat of solder overlaying said first and second coat.

References Cited

UNITED STATES PATENTS

| | | | |
|---|---|---|---|
| 2,264,900 | 12/1941 | Georgiev et al. | 317—230 |
| 2,904,618 | 9/1959 | Robinson et al. | 317—230 |
| 3,036,249 | 5/1962 | Hall | 317—230 |
| 3,179,853 | 4/1965 | Kozacka | 317—100 |
| 3,199,058 | 8/1965 | Cramer et al. | 174—50.63 |

JAMES D. KALLAM, *Primary Examiner.*